Nov. 18, 1958

E. T. BURTON 2,861,181

DELAY CIRCUITS

Filed June 1, 1953

INVENTOR
E. T. BURTON
BY James D. Folk
ATTORNEY

United States Patent Office 2,861,181

Patented Nov. 18, 1958

2,861,181

DELAY CIRCUITS

Everett T. Burton, Millburn, N. J., assignor to Bell Telephone Laboratories, Incorporated, New York, N. Y., a corporation of New York Application June 1, 1953, Serial No. 358,925

1 Claim. (Cl. 250—27)

Figure 1:
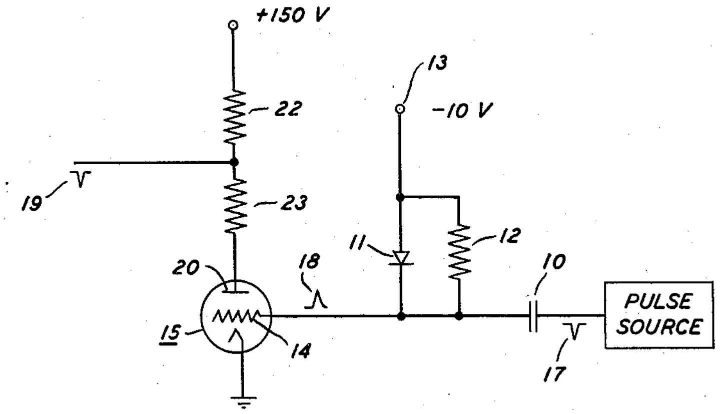

This invention relates to electrical circuits and more particularly to such circuits capable of delaying an input pulse.

Generally, delay circuits will have predetermined periods of delay. It is, however, occasionally desirable to be able to repeat a pulse immediately after the cessation of the pulse, regardless of the length of time the pulse may have been present. This situation may arise where it is necessary for some circuit to receive information and determine during the duration of the pulse whether to take action immediately on cessation of the pulse, and, if so, what action to take. The pulse, therefore, must first be applied to various information gathering elements permitting them to assemble and combine signals. Immediately thereafter the delayed pulse is applied to the circuit to permit it to take such action as is dictated by the combined signal information.

It is an object of this invention to provide an improved delay circuit capable of repeating a pulse immediately on cessation of that pulse.

This and other objects of this invention are attained in one specific illustrative embodiment wherein a pulse is applied through a condenser to the control electrode of an electron discharge device, which may advantageously be a triode. A diode and a resistor are connected to the condenser so that the initial pulse charges the condenser through the low impedance path provided by the diode. Upon cessation of the pulse, the condenser will discharge through the resistor, applying a pulse of opposite polarity to the control electrode of the triode. A pulse of the same polarity as the initial pulse and delayed by a time equal to the duration of the initial pulse will then appear at the plate of the triode. If the initial pulses are of constant duration, the time constant of the condenser and resistor may be chosen so that the output pulse at the plate of the triode is a substantial reproduction in both polarity and duration of the initial pulse. As the voltage presented by the discharge of a condenser is a slowly decaying value, which approaches the normal or base voltage exponentially, the control electrode is advantageously so biased in accordance with one aspect of this invention that the plate of the triode does not respond to the last portion of the condenser voltage. The amplitude of the output pulse may be larger than, equal to, or smaller than the amplitude of the initial pulse as desired, as is known in the art.

It is a feature of this invention that a pulse be applied to a capacitor having connected thereto a paralleled diode and resistor and the control electrode of a triode, the diode being poled to allow passage of the input pulse, so that the capacitor can charge during the duration of the input pulse and discharge through the resistor immediately upon cessation of the pulse and thereby apply a pulse of opposite polarity to the control electrode of the triode.

It is a further feature of this invention that the time constant of the resistor and capacitor be such that the pulse appearing across the resistor upon discharge of the capacitor be of substantially the same duration as the initial pulse, whereby the output pulse appearing at the plate of the triode may be a substantial reproduction of the initial pulse.

It is a still further feature of this invention that the control electrode be biased or otherwise controlled so that the last portion of the capacitor voltage on discharge of the capacitor is ineffective to cause a response in the plate circuit.

Figure 2:
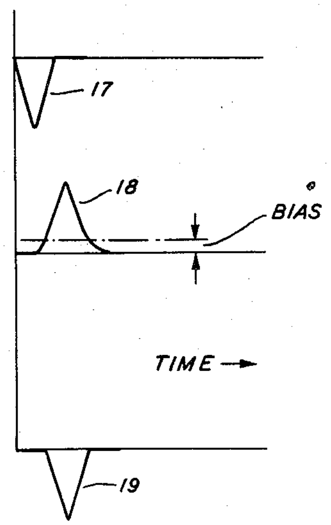

A complete understanding of this invention and of these and various other features thereof may be gained from consideration of the following detailed description and the accompanying drawing, in which:

Fig. 1 is a schematic representation of one specific illustrative embodiment of this invention; and Fig. 2 is a time diagram of the pulses appearing at various points in the embodiment of Fig. 1.

Turning now to the drawing, the specific illustrative embodiment of the invention depicted comprises a capacitor 10 to one side of which is connected the parallel combination of a varistor diode or rectifier 11, and a resistor 12. The control electrode 14 of a triode 15 is also connected to the same side of the capacitor 10. When an input pulse 17, which is to be delayed for a period equal to the duration of the pulse, is applied to the other side of the capacitor 10, the capacitor charges as the pulse finds a low resistance path through the diode 11, the diode 11 being thus poled so as to present this low impedance path to the input pulse. In the specific embodiment input pulse 17 is negative and the charging current for the capacitor 10 flows through diode 11 to a voltage source 13.

Upon cessation of the pulse the capacitor 10 will discharge through the resistor 12, applying a positive pulse 18 to control electrode 14 of the triode 15. The control electrode 14 of triode 15 is normally biased negative with respect to the cathode by the voltage source 13 so that the positive pulse 18 applied to the control electrode 14 causes the plate current to increase accordingly, thus generating an output pulse 19 at the plate 20 of the triode, the output pulse being of the opposite polarity to pulse 18 and thus of the same polarity as the input pulse 17 but delayed by the period equal to the duration of the input pulse 17. The amplitude of the output pulse 19 may be adjusted by choice of values for the two plate circuit resistors 22 and 23 and, if desired, the amplitude of pulse 19 may be identical with that of pulse 17.

The width of the delayed pulse 19 is determined by selection of values of capacitor 10 and resistor 12. Further the width, and to some extent the shape of the output pulse 19, can be controlled by biasing the control electrode 14 negative sufficiently so that the plate 20 only responds to a selected portion of the pulse on the control electrode.

A circuit in accordance with this invention is particularly applicable where the duration of the input pulse 17 is variable but it is desired to have a command pulse, of the same polarity, transmitted to some other circuit immediately upon cessation of the input pulse. However, circuits in accordance with this invention may also be employed where the input pulse is of constant duration, in which case the time constant of the capacitor 10 and resistor 12 can be so chosen that the duration of the output pulse 19 is substantially the same as the duration of the input pulse 17, as described above.

In one specific illustrative embodiment of this invention wherein input pulses of constant duration of 0.6 microsecond and 30 volts amplitude were to be repeated, capacitor 10 was 47 micromicrofarads, resistor 12, 22,000 ohms, and triode 15 a 396A tube. In this embodiment the output pulses 19 were made to substantially reproduce the input pulses 17 but delayed by 0.6 microsecond. The time relationships of the pulses 17, 18 and 19 are depicted in Fig. 2.

While in the embodiment of this invention, described above with reference to Fig. 1 of the drawing, the pulse being delayed was negative, it is to be understood that the same principles may be applied to delay pulses of positive polarity in accordance with this invention. In the latter case, the diode 11 would be reversed in polarity and the control electrode would be suitably biased, preferably at or near the cathode potential.

It is thus to be understood that the above-described arrangements are illustrative of the application of the principles of the invention. Numerous other arrangements may be devised by those skilled in the art without departing from the spirit and scope of the invention.

What is claimed is:

An electrical circuit comprising a space discharge device having at least cathode, anode and control electrode means, means applying a bias voltage to said control electrode to maintain said space discharge device nonconducting to electric current, impedance means comprising a diode and resistor in parallel arrangement connecting said bias voltage means to said control electrode, a source of negative input pulses, a capacitor connecting said pulse source to said control electrode, said capacitor being of sufficiently small size relative to said impedance means that input pulses from said source charge said capacitor to a potential substantially equal to the amplitude of said input pulses, said capacitor upon termination of a said input pulse discharging through said impedance to drive said space discharge device into a condition for current conduction, and load means connected to said space discharge device.

References Cited in the file of this patent

UNITED STATES PATENTS

| | | |
|---|---|---|
| 2,230,926 | Bingley | Feb. 4, 1941 |
| 2,240,420 | Schnitzer | Apr. 29, 1941 |
| 2,313,906 | Wendt | Mar. 16, 1943 |
| 2,510,129 | Moore | June 6, 1950 |
| 2,598,929 | Moore | June 3, 1952 |
| 2,659,837 | Murdock | Nov. 17, 1953 |